United States Patent [19]

Ushiku

[11] Patent Number: 5,692,198
[45] Date of Patent: Nov. 25, 1997

[54] METHOD FOR EXECUTING A PROCESS DEFINED BY A SCRIPT BY A PLURALITY OF TYPES OF DESCRIPTION LANGUAGES AND AN APPARATUS THEREFOR

[75] Inventor: Toyohiko Ushiku, Yamato, Japan

[73] Assignee: Canon Kabushiki Kaisha, Tokyo, Japan

[21] Appl. No.: 330,075

[22] Filed: Oct. 26, 1994

[30] Foreign Application Priority Data

Oct. 27, 1993 [JP] Japan .................................. 5-291349

[51] Int. Cl.$^6$ ...................................................... G06F 15/00
[52] U.S. Cl. ........................................................ 395/762
[58] Field of Search ..................................... 395/762, 752, 395/754, 759; 364/419.01, 419.02, 419.06, 419.08, 419.1

[56] References Cited

U.S. PATENT DOCUMENTS

5,587,902  12/1996  Kugimiya ................. 395/798

*Primary Examiner*—Phu K. Nguyen
*Attorney, Agent, or Firm*—Fitzpatrick, Cella, Harper & Scinto

[57] ABSTRACT

When a user specifies an object stored in a memory of an apparatus and instructs an operation to be performed on that object, the apparatus determines the type of script description language describing the script held by the specified object and interprets the script using an interpretation unit corresponding to the determined script type, selected from among a plurality of interpretation units in the apparatus each corresponding to a respective type of script description language. The apparatus then executes a process corresponding to the interpreted script. In one version, the apparatus can request another apparatus to interpret the script and receive the interpreted script from the other apparatus, if none of the interpretation units in the first apparatus corresponds to the determined script type.

12 Claims, 4 Drawing Sheets

METHOD FOR EXECUTING A PROCESS DEFINED BY A SCRIPT BY A PLURALITY OF TYPES OF DESCRIPTION LANGUAGES AND AN APPARATUS THEREFOR

BACKGROUND OF THE INVENTION

1. Field of the Invention

The present invention relates to a method for executing a process defined in a character string or the like (hereinafter "script") in an object in response to a user operation on the object, and an apparatus therefor.

2. Related Background Art

A text processing apparatus having a hypertext function has been known. In the hypertext, a script which describes a process to be executed in response to the user operation on the object can be provided. When the user instructs an operation on the object, the script is interpreted, a determination is made as to whether a process for the user operation is defined or not, and if it is defined, the process described in the script is executed. The script must be described in a description language unique to the system.

However, in the prior art text processing apparatus, since only one language for describing the script may be provided, the following problems are involved.

(1) The user cannot select a desired script description language.

The user must use the provided script description language even if it is not what the user wants.

(2) Even if the text processing apparatus is compatible with a plurality of languages, the script description language is not compatible with plural languages.

For example, even if the text processing apparatus is compatible with Japanese, English and French, only one script description language is available, and even if Japanese is used as the text, the script must be described in English.

SUMMARY OF THE INVENTION

It is an object of the present invention to provide an information processing apparatus which permits the use of a plurality of script description languages.

It is another object of the present invention to provide an information processing apparatus which can add and delete types of available script description languages.

It is still another object of the present invention to provide an information processing apparatus which interprets a script by a script description language of the type which cannot interpret by its own apparatus by using other apparatus to execute a corresponding process.

According to one aspect, the present invention which achieves these object relates to an apparatus for executing a process defined by a script, comprising memory means for storing an object, instruction means for specifying the object stored in the memory means and instructing an operation to be performed on the object, determination means for determining a type of script description language describing a script held by the object specified by the instruction means, a plurality of interpretation means for interpreting the scripts described in a plurality of script description languages, execution means for executing a process corresponding to the script interpreted by one of the interpretation means, and control means for controlling the interpretation means to interpret the script held by the specified object by the interpretation means corresponding to the script type determined by the determination means.

According to another aspect, the present invention which achieves these objects relates to an apparatus for executing a process defined by a script, comprising memory means for storing an object, instruction means for specifying the object stored in the memory means and instructing an operation to be performed on the object, determination means for determining a type of script description language describing a script held by the object specified by the instruction means, a plurality of interpretation means for interpreting the scripts described in a plurality of script description languages, execution means for executing a process corresponding to the script interpreted by one of the interpretation means, communication means for communicating with another apparatus, discrimination means for determining whether the type of script determined by the determination means can be interpreted by one of the interpretation means, first control means for requesting of the other apparatus through the communication means the interpretation of the script when the discrimination means determines that the script cannot be interpreted, and second control means for receiving from the other apparatus through the communication means the script interpreted by the other apparatus in response to the request and controlling the execution means to execute the process corresponding to the received interpreted script.

According to still another aspect, the present invention which achieves these objects relates to a method for executing a process defined by a script comprising the steps of specifying an object stored in a memory, instructing an operation to be performed on the specified object, determining a type of script description language describing a script held by the specified object, interpreting the script held by the specified object by an interpretation unit for the determined script type of a plurality of interpretation units for interpreting the scripts described in a plurality of script description languages, and executing a process corresponding to the interpreted script.

According to a further aspect, the present invention which achieves these objects relates to a method for controlling an apparatus for executing a process defined by a script, comprising the steps of specifying an object stored in a memory, instructing an operation to be performed on the specified object, determining a type of script description language describing a script held by the specified object, determining whether the type of the determined script can be interpreted by the apparatus itself, and when it is determined in the determination step that it cannot be interpreted, requesting the interpretation of the script of another apparatus through a communication unit, receiving from the other apparatus through the communication unit the script interpreted by the other apparatus in response to the request, and executing a process corresponding to the received interpreted script.

Other objects and advantages besides these discussed above will be apparent to those skilled in the art from the description of the preferred embodiments of the invention which follows. In the description, reference is made to the accompanying drawings which form a part thereof, and which illustrate examples of the invention. Such examples, however, are not exhaustive of the various embodiments of the invention, and therefore reference is made to the claims which follow the description for determining the scope of the invention.

DETAILED DESCRIPTION OF THE PREFERRED EMBODIMENTS

The preferred embodiments of the present invention will be described in detail hereinbelow with reference to the drawings.

[First Embodiment]

Figure 1:
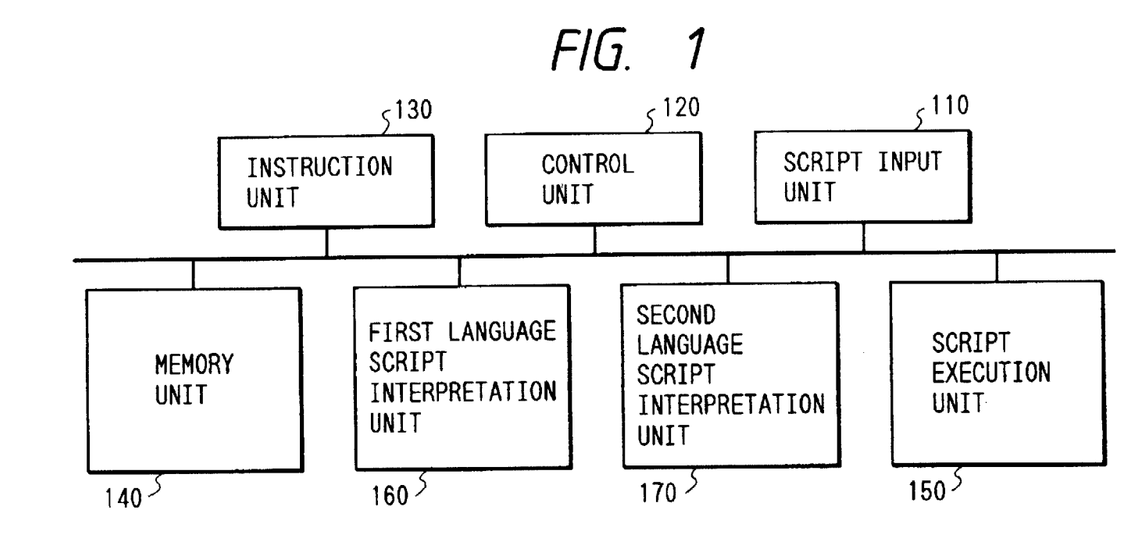
FIG. 1 shows a block diagram of a configuration of one embodiment of a text processing apparatus of the present invention.

FIG. 1 shows a block diagram of a schematic configuration of a first embodiment of a text processing apparatus of the present invention. Numeral 110 denotes a script input unit for inputting a script described in a script description language for each object and displaying information to a user, numeral 120 denotes a control unit for controlling the entire system, numeral 130 denotes an instruction unit by which the user operates each object, numeral 140 denotes a memory unit for storing objects and scripts, numeral 150 denotes a script execution unit for executing a process described by the script, numeral 160 denotes a first language script interpretation unit for interpreting a first script description language available in the text processing apparatus, and numeral 170 denotes a second language script interpretation unit for interpreting a second script description language available in the text processing apparatus.

Figure 2:
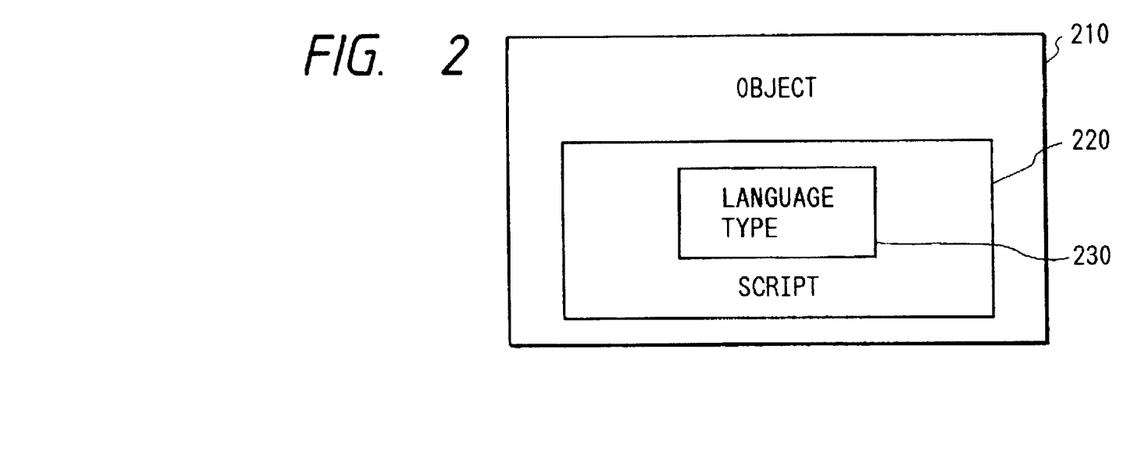
FIG. 2 shows a data structure of an object.

FIG. 2 shows a data structure of an object stored in the memory unit 140 of FIG. 1. In FIG. 2, numeral 210 denotes an object to be operated on by the user, numeral 220 denotes a script described in the script description language, and numeral 230 denotes a language type indicating whether the script 220 is described in the first script description language or the second script description language.

Referring to FIGS. 1 and 2, operation of the first embodiment is explained.

When the user specifies the object 210 by means of the instruction unit 130 to start the script editing operation, a request to start the script editing is issued from the instruction unit 130 to the control unit 120. The control unit 120 responds to the request to start the script editing to start the script input unit 110, which, when started, displays the content of the script 220 if the object 210 specified by the user through the instruction unit 130 already has the script 220 and prompts the editing of the content. On the other hand, if the specified object does not have the script 220 yet, the script input unit 110 displays a message prompt to the user to do what is necessary for the creation of the script 220 and the selection of the script description language.

When the user completes the creation of the script 220 or the editing of the script through the script input unit 110, the script input unit 110 stores the input or the editing result in the script 220 in the object 210. When the script 220 is created, the information indicating the script description language which the user has selected is stored in the language type 230.

When the user executes an operation A on the object 210 by using the instruction unit 130, the fact of the execution of the operation A is conveyed to the control unit 120. When so informed, the control unit 120 determines whether the script 220 is present in the object 210 on which the operation A has been executed.

If the script 220 is present, the control unit 120 determines whether the script 220 is described in the first script description language or the second script description language based on the language type in the script 220, and if it is described in the first script description language, the fact of the execution of the operation A is conveyed to the first language script interpretation unit 160, and if it is described in the second script description language, it is conveyed to the second language script interpretation unit 170.

When so informed, the first language script interpretation unit 160 or the second language script interpretation unit 170 interprets the script 220 (the process corresponding to the operation), determines whether the process corresponding to the operation A is described or not, and if it is described, requests to the script execution unit 150 to execute the described process corresponding to the operation A. In response to the request, the script execution unit 150 executes the process relating to the request.

In this manner, the language type 230 is provided in the script 220 and the script is interpreted by the script interpretation unit 160 or 170 for the language corresponding to the language type 230 and is executed by the script execution unit 150. Accordingly, a number of script description languages may be used and operability for the user is improved.

[Second Embodiment]

Figure 3:
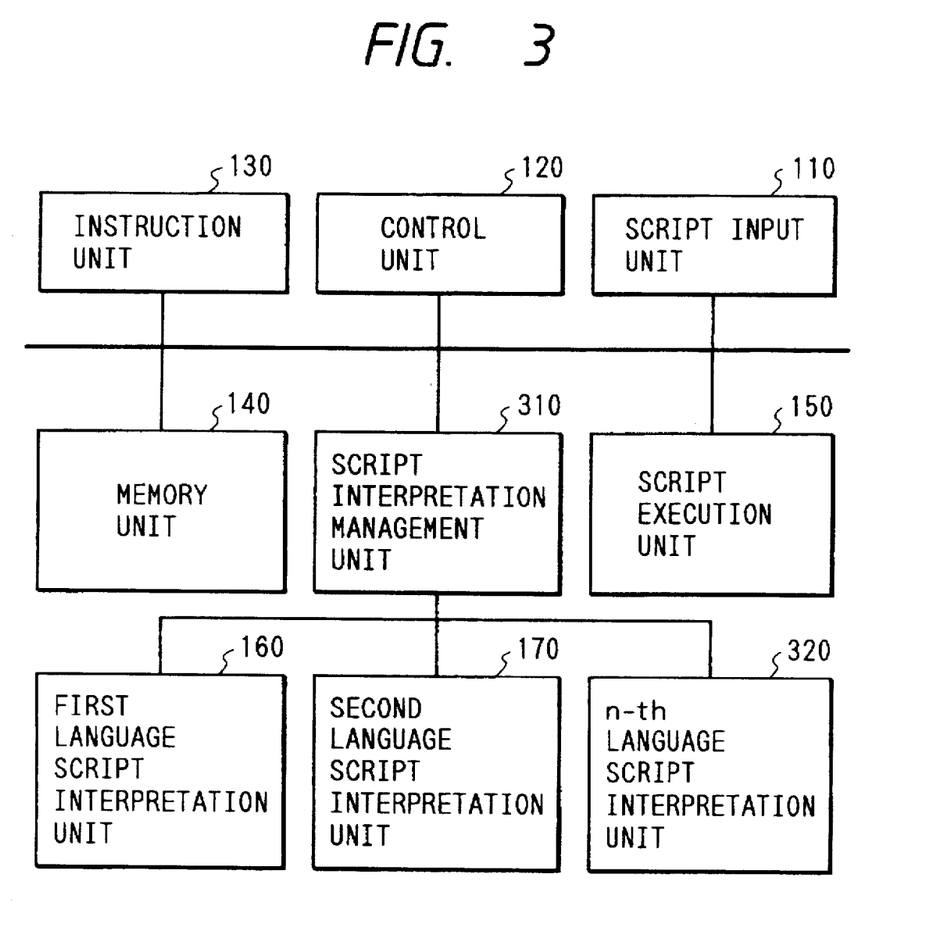
FIG. 3 shows a block diagram of a configuration of a second embodiment of the text processing apparatus of the present invention.

FIG. 3 shows a block diagram of a schematic configuration of a second embodiment of the text processing apparatus of the present invention. It comprises, in addition to the script input unit 110, the control unit 120, the instruction unit 130, the memory unit 140, the script execution unit 150, the first language script interpretation unit 160 and the second language script interpretation unit 170 of the first embodiment, an n-th language script interpretation unit 320 for interpreting an n-th (n=3, 4, 5, . . . , n) script description language available in the text processing apparatus and a script interpretation management unit 310 for managing the group of the first, second and n-th language script interpretation units 160, 170 and 320.

Figure 4:
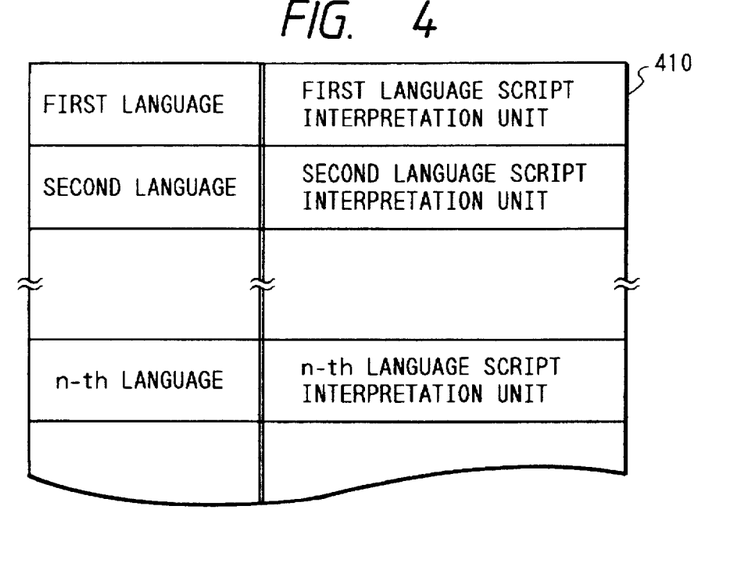
FIG. 4 shows a script interpretation management table.

FIG. 4 shows a script interpretation management table 410 which associates the script description language used to describe the script in the memory unit 140 with the script interpretation unit for interpreting the script description language. The script interpretation management unit 310 uses the script interpretation management table 410 to specify from the script interpretation units only one of the script interpretation unit to which the execution of the operation is to be informed. The script interpretation management table 410 is stored in the memory unit 140.

Referring to FIGS. 2, 3 and 4, an operation of the second embodiment is explained.

When the apparatus is started, the control unit 120 instructs the initialization of the group of script interpretation units to the script interpretation management unit 310. The script interpretation management unit 310 starts the group of script interpretation units (the first language script interpretation unit 160, the second language script interpretation unit 170, the n-th language script interpretation unit 320) described in the script interpretation management table 410 in the memory unit 140. The script is created or edited. This operation is identical to that of the first embodiment.

When the user executes the operation A on the object 210 through the instruction unit 130, the execution of the operation A is communicated to the control unit 120 as it is in the first embodiment. When so informed, the control unit 120 transfers the information to the script interpretation management unit 310. When the script interpretation management unit 310 is informed of the execution of the operation A, it determines whether the script 220 is present in the object 210 for which the operation A has been executed.

If the script 220 is present, the script interpretation management unit 310 determines which one of the first, second and n-th script description languages is used to described the script 220 based on the language type 230 in the script 220. It refers to the script interpretation management table 410 to specify the script interpretation unit corresponding to the determined script description language, and informs that script interpretation unit that the operation A has been instructed in the script 220.

When so informed, the script interpretation unit interprets the script 220 in the same manner as that of the first embodiment and determines whether the process for the operation A is described or not, and if it is described, requests of the script execution unit 150 to execute the described process for the operation A. When the script execution unit 150 receives the request, it executes the process relating to the request.

If the script description language determined by the script interpretation management unit 310 is not present in the script interpretation management table 410, or if the user instructs to add a script interpretation unit through the instruction unit 130, the script interpretation management unit 310 displays a message to prompt to the user to specify the script description language and the script interpretation unit for that language. When the user specifies the script description language and the script interpretation unit in response thereto, the script interpretation management unit 310 adds the pair of the specified script description language and the script interpretation unit to the script interpretation management table 410.

When the deletion of a script description language is instructed by the user through the instruction unit 130, the script interpretation management unit 310 deletes the entry for the specified script description language from the script interpretation management table 410.

[Third Embodiment]

In the first and second embodiments, the script interpretation unit directly requests execution by the script execution unit. Alternatively, it may be executed through an intermediate language.

Figure 5:
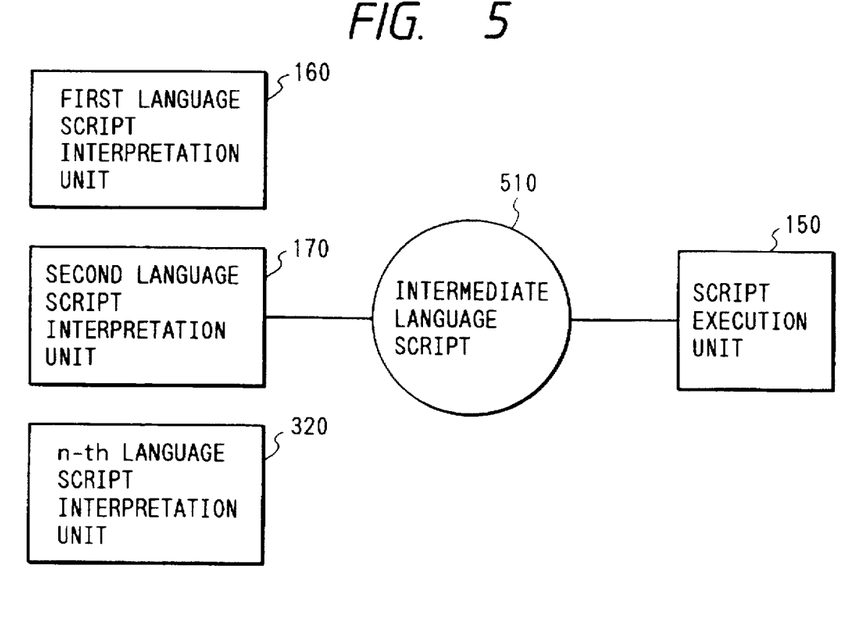
FIG. 5 shows a relation between a script interpretation unit and a script execution unit.

FIG. 5 shows a relation between the script interpretation unit and the script execution unit in the third embodiment. An intermediate language script 510 for conveying the content of the script 220 to the script execution unit 150 from the first, second and n-th language script interpretation units 160, 170 and 320 is interposed between the first language script interpretation unit 160, the second language script interpretation unit 170, the n-th language script interpretation unit 320 and the script execution unit 150. Otherwise, the configuration is identical to that of the second embodiment.

Referring to FIG. 5, an operation of the script interpretation units and the script execution unit 150 of the third embodiment is explained. Operations of other elements are similar to those of the second embodiment.

When the script described in the first language is applied to the first language script interpretation unit 160, the script described in the first language is translated by the first language script interpretation unit 160 to the intermediate language script 510 having the same meaning, and it is supplied to the execution unit 150 along with the content of the operation. Then, the script execution unit 150 interprets the intermediate language script 510, and if the process to the given operation content is described in the intermediate language script 510, it executes the process.

[Fourth Embodiment]

The script interpretation unit for interpreting the script description language need not be in the same apparatus, and the script may instead be interpreted by the script interpretation unit in another apparatus.

Figure 6:
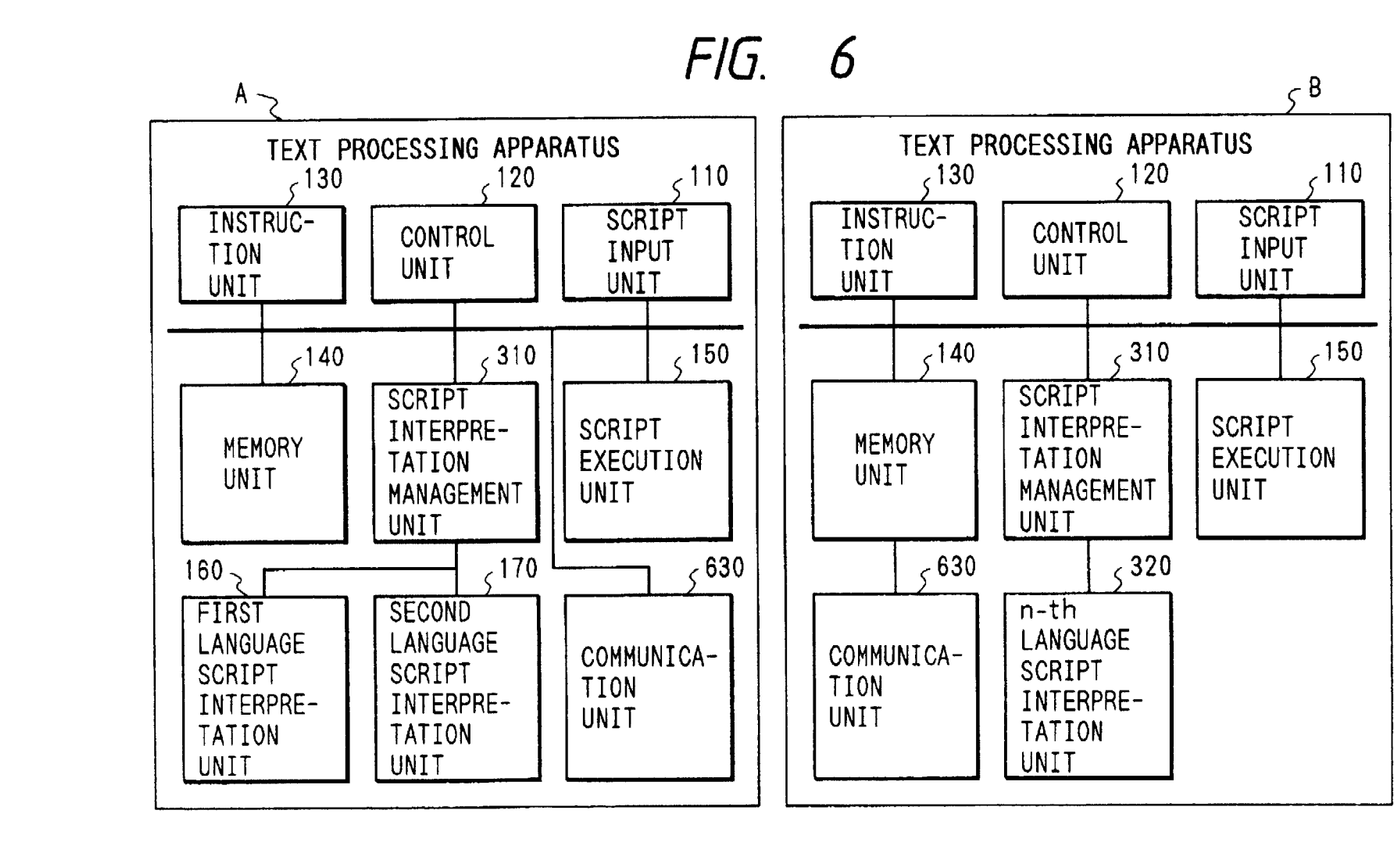
FIG. 6 shows a block diagram of a configuration of a further embodiment of the text processing apparatus of the present invention.

FIG. 6 shows a block diagram of a schematic configuration of another embodiment of the text processing system of the present invention. It comprises a text processing apparatus A and a text processing apparatus B. The text processing apparatus A comprises the script input unit 110, the control unit 120, the instruction unit 130, the memory unit 140, the script execution unit 150, the first language script interpretation unit 160, the second language script interpretation unit 170, the script interpretation management unit 310 and a communication unit 630. The text processing apparatus B comprises the script input unit 110, the control unit 120, the instruction unit 130, the memory unit 140, the script execution unit 150, the n-th language script interpretation unit 320, the script interpretation management unit 310 and the communication unit 630.

The text processing apparatus A has the first language script interpretation unit 160 and the second language script interpretation unit 170 as its script interpretation units while the text processing unit B has the n-th language script interpretation unit 320. The apparatuses A and B can communicate the data to each other through the communication units 630.

Referring to FIGS. 2, 4, 5 and 6, operation of the fourth embodiment is explained. In the present embodiment, the operations other than the operation between the interpretation of the script and the execution thereof are identical to those of the third embodiments.

When the user of the text processing apparatus A operates the object having the script described in the n-th language, the text processing apparatus A requests to the script interpretation management unit 310 to interpret the script 220 of the object 210. Thus, when the script interpretation management unit 310 recognizes by the language type 230 of the script 220 that-the script 220 is described in the n-th language, it refers to its own script interpretation management table 410 to determine whether a script interpretation unit which can interpret the n-th language is present in apparatus A.

If a script interpretation unit which can interpret the n-th language is not present in apparatus A, it sends the script 220 and the language type 230 to the script interpretation management unit 310 of the text processing apparatus B through the communication unit 630, requesting the interpretation of the script. Then, the script interpretation management unit 310 of the text procesisng apparatus B refers to its own script interpretation management table 410 in the same manner as that conducted in the text processing apparatus A to determine whether the script interpretation unit, that is, the n-th language script interpretation unit 320, is present in apparatus B.

If the n-th language script interpretation unit 320 is present in apparatus B, the script interpretation management unit 310 requests of the n-th language script interpretation unit 320 the interpretation of the script 220. When the n-th language script interpretation unit 320 receives such request, it translates the script 220 to the intermediate language script 510 and sends it back to the script interpretation management unit 310 of the text processing apparatus B.

Then, the script interpretation management unit 310 transmits the received intermediate language script 510 to the script interpretation management unit 310 of the text processing apparatus A through the communication unit 630. The script interpretation management unit 310 of the test processing apparatus A transfers the received intermediate language script 510 to the script execution unit 150, requesting the execution of the process for the operation described in the script.

Although the present invention has been described in its preferred forms with a certain degree of particularity, many apparently widely different embodiments of the invention can be made without departing from the spirit and scope thereof. It is to be understood that the invention is not limited to the specific embodiments thereof except as defined in the appended claims.

What is claimed is:

1. An apparatus for executing a process defined by a script, comprising:

memory means for storing an object;

instruction means for specifying the object stored in said memory means and instructing an operation to be performed the object, determination means for determining a type of script description language describing the script held by the object specified by said instruction means;

a plurality of interpretation means for interpreting scripts described in a plurality of script description languages;

execution means for executing a process corresponding to the script interpreted by one of said interpretation means; and control means for controlling said interpretation means to interpret the script held by the specified object by the interpretation means corresponding to the script type determined by said determination means.

2. An apparatus according to claim 1, wherein said memory means stores type identification information of the script description languages describing the script for each object, and said determination means reads out the identification information from said memory means to determine the type of the script description language.

3. An apparatus according to claim 2, further comprising:

script generation means for generating a script for the object stored in said memory means; and memory control means for causing said memory means to store the type of script description language describing the script generated by said script generation means.

4. An apparatus according to claim 1, wherein said control means includes a management table defining a relation between the type of script description language and the interpretation means for interpreting the script description language.

5. An apparatus according to claim 1, wherein each of said interpretation means outputs a script described in an intermediate language common to the interpretation means as an interpretation result of the script.

6. An apparatus for executing a process defined by a script, comprising:

memory means for storing an object;

instruction means for specifying the object stored in said memory means and instructing an operation to performed on the object;

determination means for determining a type of script description language describing the script held by the object specified by said instruction means;

a plurality of interpretation means for interpreting scripts described in a plurality of script description languages;

execution means for executing a process corresponding to the script interpreted by one of said interpretation means;

communication means for communicating with another apparatus;

discrimination means for determining whether the type of script determined by said determination means can be interpreted by one of said interpretation means;

first control means for requesting to the other apparatus through said communication means the interpretation of the script when said discrimination means determines that the script cannot be interpreted; and second control means for receiving from the other apparatus through said communication means the script interpreted by the other apparatus in response to the request and controlling said execution means to execute the process corresponding to the received interpreted script.

7. A method for executing a process defined by a script comprising the steps of:

specifying an object stored in a memory;

instructing an operation to be performed on the specified object;

determining a type of script description language describing the script held by the specified object;

interpreting the script held by the specified object using an interpretation unit for the determined script type from among a plurality of interpretation units for interpreting scripts described in a plurality of script description languages; and executing a process corresponding to the interpreted script.

8. A method according to claim 7, wherein said memory stores type identification information of the script description languages describing the script for each object, and said determination step reads out the identification information from said memory to determine the type of script description language.

9. A method according to claim 8, further comprising the steps of:

generating a script for the object stored in the memory; and storing the type of script description language describing the generated script in the memory.

10. A method according to claim 7, wherein said interpretation step includes determining the interpretation unit corresponding to the determined script type, from among the plurality of interpretation units, by referring to a management table defining a relation between the type of script description language and the interpretation unit for interpreting the script description language.

11. A method according to claim 7, wherein said interpretation step includes outputting a script described in an intermediate language common to the plurality of interpretation units as an interpretation result of the script.

12. A method for controlling an apparatus for executing a process defined by a script, comprising the steps of:

specifying an object in a memory;

instructing an operation to be performed on the specified object;

determining a type of script description language describing the script held by the specified object;

determining whether the type of the determined script can be interpreted by the apparatus;

when determined in said determination step that the script cannot be interpreted, requesting interpretation of the script by the other apparatus through a communication unit;

receiving from the apparatus through the communication unit the script interpreted by the other apparatus in response to the request; and executing a process corresponding to the received interpreted script.

* * * * *

UNITED STATES PATENT AND TRADEMARK OFFICE
CERTIFICATE OF CORRECTION

PATENT NO. : 5,692,198

DATED : November 25, 1997

INVENTOR(S) : TOYOHIKO USHIKU

It is certified that error appears in the above-identified patent and that said Letters Patent is hereby corrected as shown below:

COLUMN 1

Line 53, "object" should read --objects--.

COLUMN 3

Line 55, "prompt to" should read --to prompt--.

COLUMN 4

Line 24, "220" should read --220,--.
    Line 28, "used" should read --used,--.
    Line 52, "unit" should read --units--.

COLUMN 5

Line 31, "prompt to" should read --prompt--.
    Line 36, "language" should read --languages--.

COLUMN 6

Line 32, "units" should read --units,--.
    Line 44, "to" should be deleted.
    Line 48, "that-the" should read --that the--.

UNITED STATES PATENT AND TRADEMARK OFFICE
CERTIFICATE OF CORRECTION

PATENT NO. : 5,692,198

DATED : November 25, 1997

INVENTOR(S): TOYOHIKO USHIKU

It is certified that error appears in the above-identified patent and that said Letters Patent is hereby corrected as shown below:

<u>COLUMN 7</u>

```
Line 28, "the" should read --on the--.
Line 66, "to" should read --to be--.
```

Signed and Sealed this

Twenty-first Day of July, 1998

Attest:

BRUCE LEHMAN

*Attesting Officer*    *Commissioner of Patents and Trademarks*